United States Patent
Hogge, Jr. et al.

(10) Patent No.: US 7,707,308 B1
(45) Date of Patent: Apr. 27, 2010

(54) OSPF ROUTING TO GEOGRAPHICALLY DIVERSE APPLICATIONS USING OSPF AND ROUTE HEALTH INJECTION (RHI)

(75) Inventors: Thomas W. Hogge, Jr., Monroe, NJ (US); Michael Hoarle, Branchburg, NJ (US)

(73) Assignee: Cello Partnership, Basking Ridge, NJ (US)

( * ) Notice: Subject to any disclaimer, the term of this patent is extended or adjusted under 35 U.S.C. 154(b) by 472 days.

(21) Appl. No.: 11/819,189

(22) Filed: Jun. 26, 2007

(51) Int. Cl.
G06F 15/16 (2006.01)
G06F 15/173 (2006.01)

(52) U.S. Cl. .................... 709/239; 709/218; 709/228; 709/238; 709/242

(58) Field of Classification Search ................ 709/218, 709/224, 228, 238, 239, 242, 245
See application file for complete search history.

(56) References Cited

U.S. PATENT DOCUMENTS

| | | | |
|---|---|---|---|
| 6,760,775 B1 * | 7/2004 | Anerousis et al. | 709/238 |
| 6,885,667 B1 * | 4/2005 | Wilson | 709/245 |
| 7,120,455 B1 | 10/2006 | Chen et al. | |
| 7,260,648 B2 * | 8/2007 | Tingley et al. | 709/242 |
| 7,467,225 B2 * | 12/2008 | Anerousis et al. | 709/239 |
| 7,542,461 B2 * | 6/2009 | Oran | 709/224 |
| 7,590,149 B1 * | 9/2009 | Bharali et al. | 709/238 |

OTHER PUBLICATIONS

Hogge, W., Geographically Diverse Messaging System (GDMS)—OSPF Design Document, Verizon Wireless, Jun. 8, 2007, pp. 1-24, Version 0.8, CellCo Partnership d/b/a Verizon Wireless.
"Open Shortest Path First", Wikipedia, the free encyclopedia, http://en.wikipedia.org/wiki/Open_Shortest_Path_First, Last Modified Jan. 4, 2007, Last Accessed Jan. 5, 2007, pp. 1-6, Wikimedia Foundation, Inc.
"Open Shortest Path First (OSPF)", http://www.cisco.com/univercd/cc/td/doc/cisintwk/ito_doc/ospf.htm, Last Modified Oct. 12, 2006, Last Accessed Jan. 5, 2007, pp. 1-4, Cisco Systems, Inc.
"OSPF Design Guide", Document ID: 7039, http://www.cisco.com/warp/public/104/1.html, Last Modified Apr. 7, 2006, Last Accessed Jan. 5, 2007, pp. 1-60, Cisco Systems, Inc.
"Chapter 17: Route Health Injection", Advanced Configuration and Management Guide, http://www.hp.com/rnd/support/manuals/pdf/release_06628_07110/Bk2_Ch17_Route_Inject.pdf, Last Accessed May 9, 2007, pp. 17-1-17-8.

* cited by examiner

Primary Examiner—Quang N. Nguyen
(74) Attorney, Agent, or Firm—McDermott Will & Emery LLP

(57) ABSTRACT

A first message server is placed in a first geographic location, a second message server is placed in a second geographic location, and Open Shortest Path First (OSPF) metrics are used to properly route traffic to a surviving message server if one geographic location is destroyed.

11 Claims, 11 Drawing Sheets

FIGURE 2 LOCAL REDUNDANCY (PRIOR ART)

GEOGRAPHIC ZONE-1 210

MOBILE SWITCHING CENTER-1 (MSC-1) 220

(NO SHORT MESSAGE SERVICE CENTER)

GEOGRAPHIC ZONE-2 230

MOBILE SWITCHING CENTER-2 (MSC-2) 240

SHORT MESSAGE SERVICE CENTER-AB (SMSC-AB) 250

- BALANCER-A 252
- MESSAGE SERVER-A 254
- BALANCER-B 256
- MESSAGE SERVER-B 258

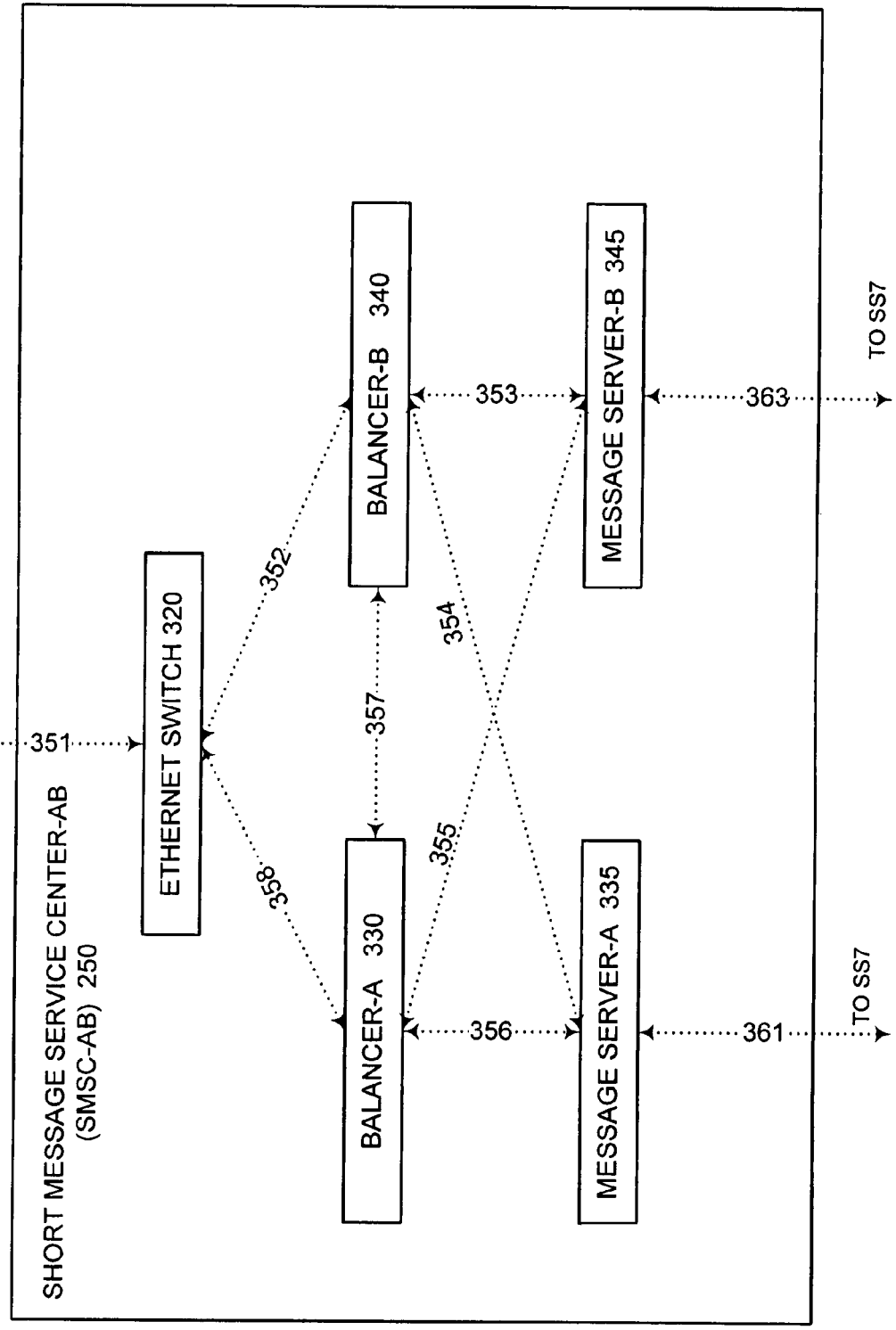
FIGURE 3  LOCAL REDUNDANCY DETAIL  (PRIOR ART)

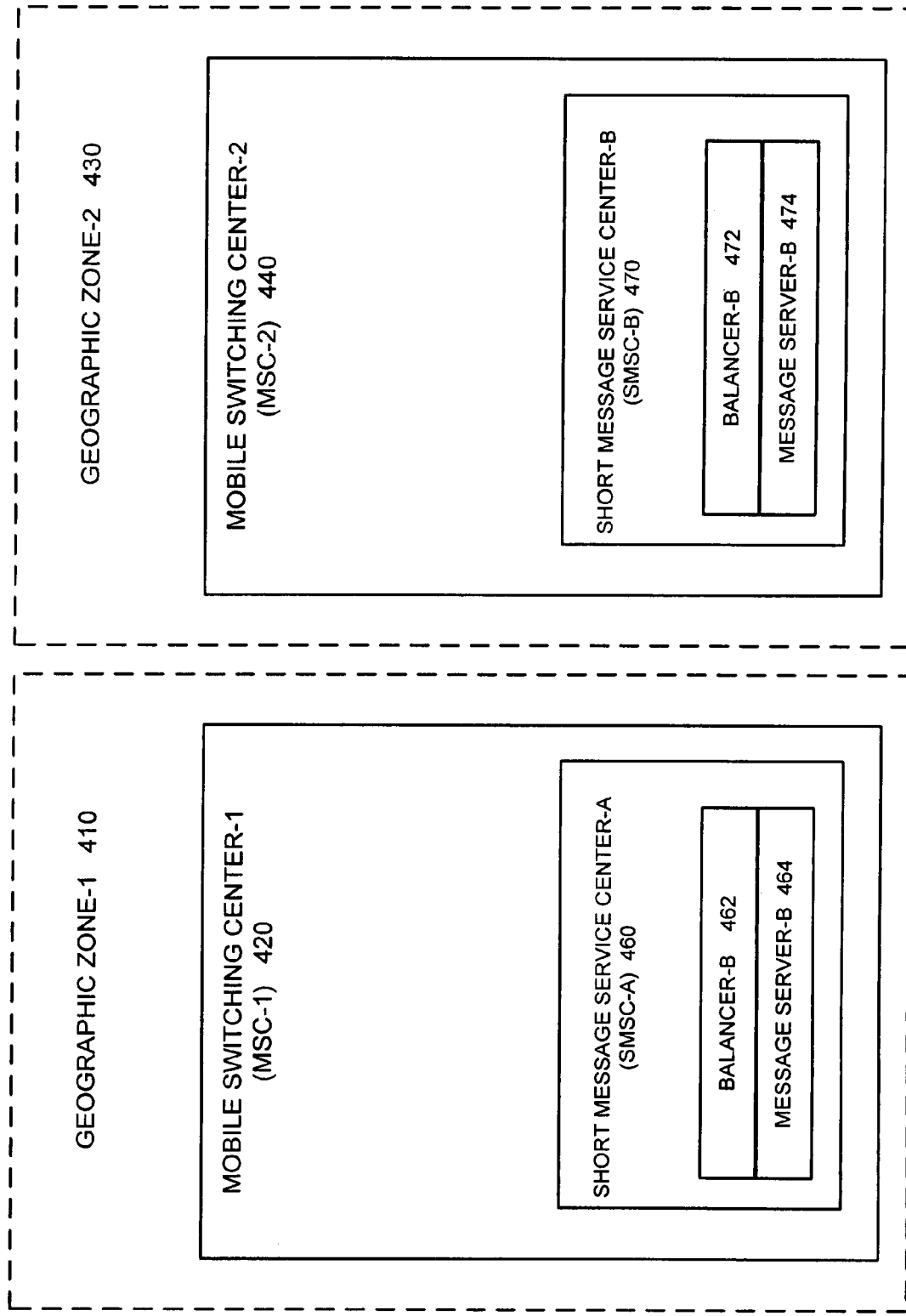
FIGURE 4   GEOGRAPHIC REDUNDANCY

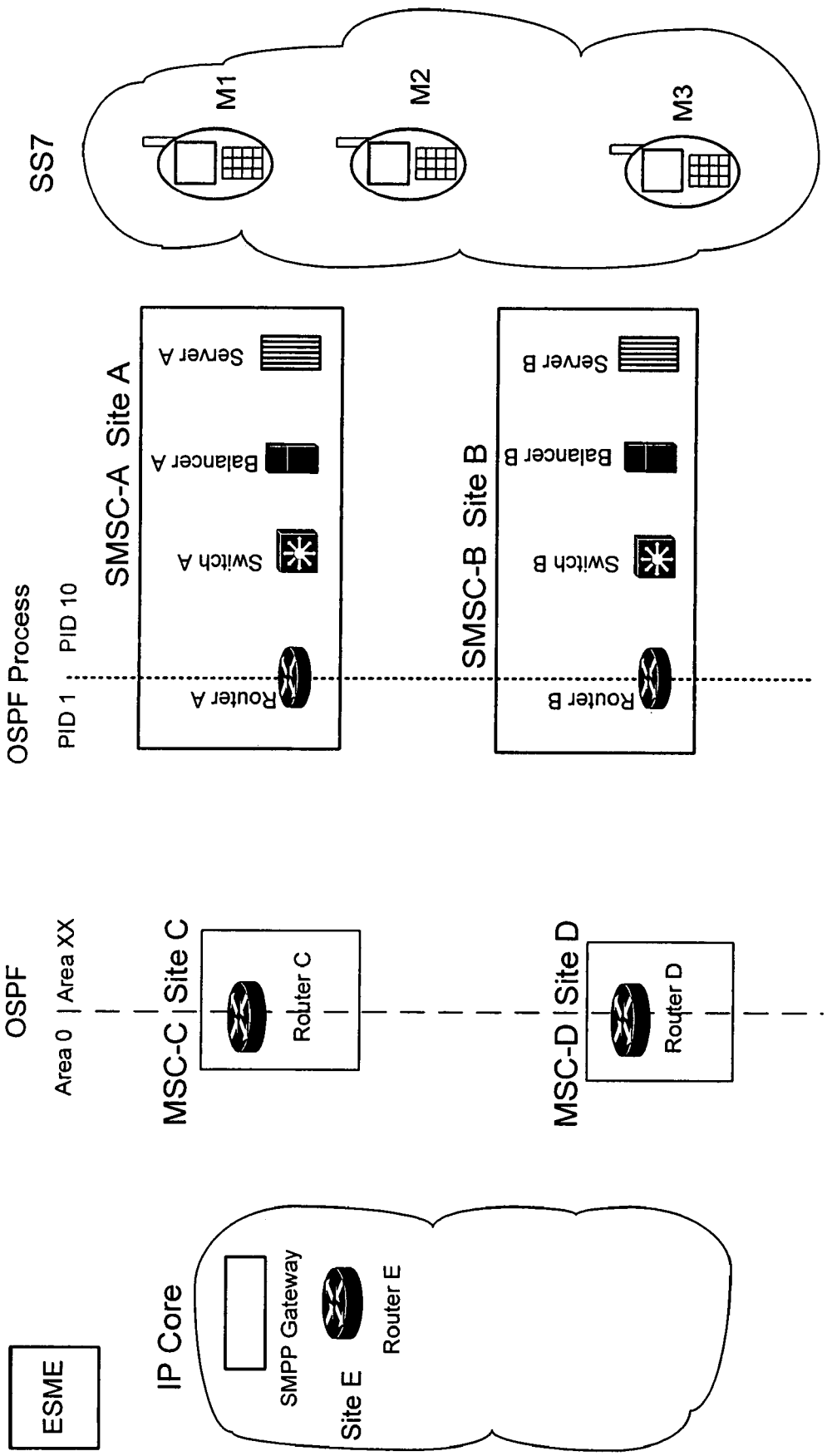
FIGURE 5 GEOGRAPHIC REDUNDANCY DETAIL - HARDWARE

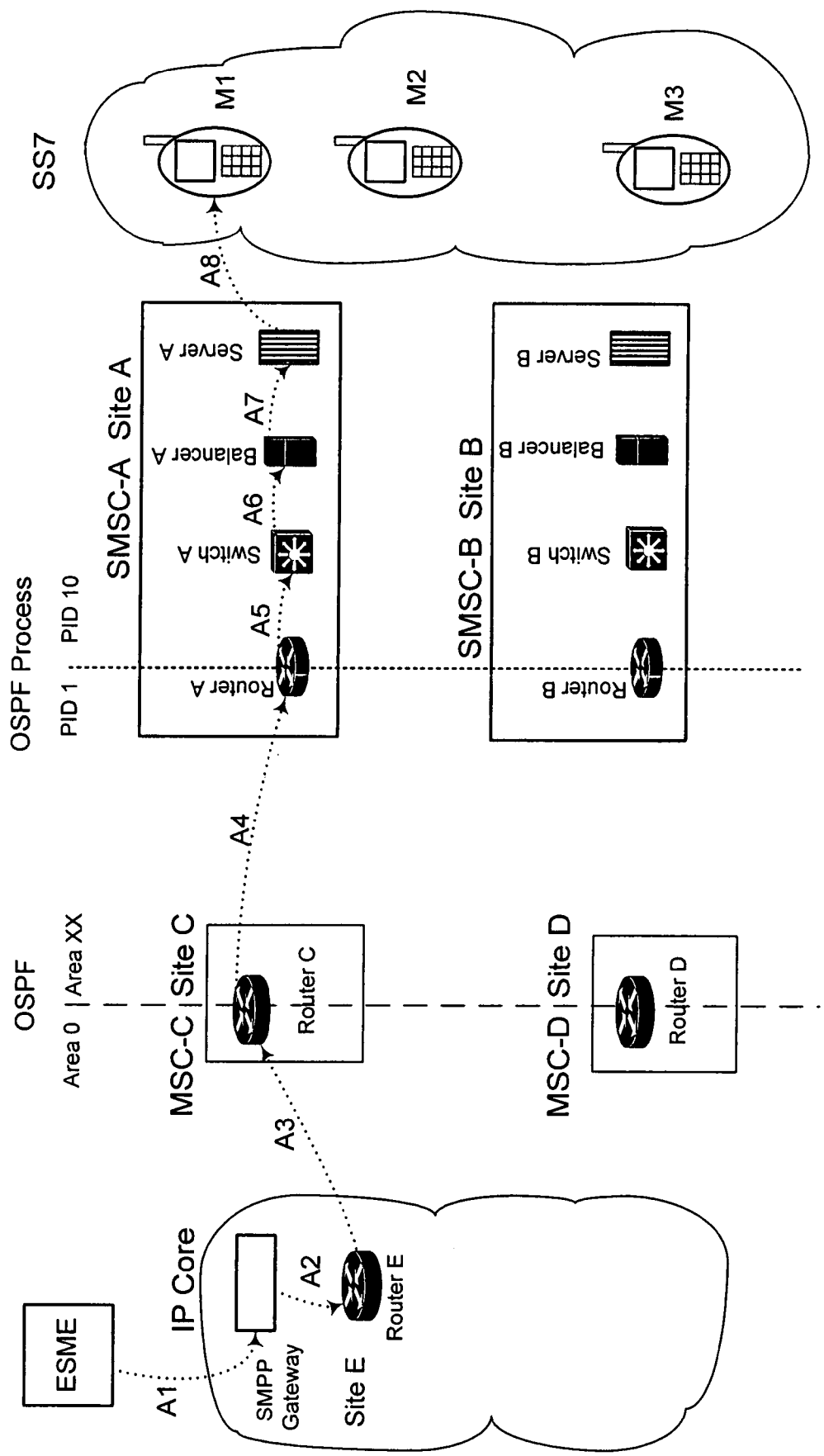
FIGURE 6 GEOGRAPHIC REDUNDANCY DETAIL – FLOW A

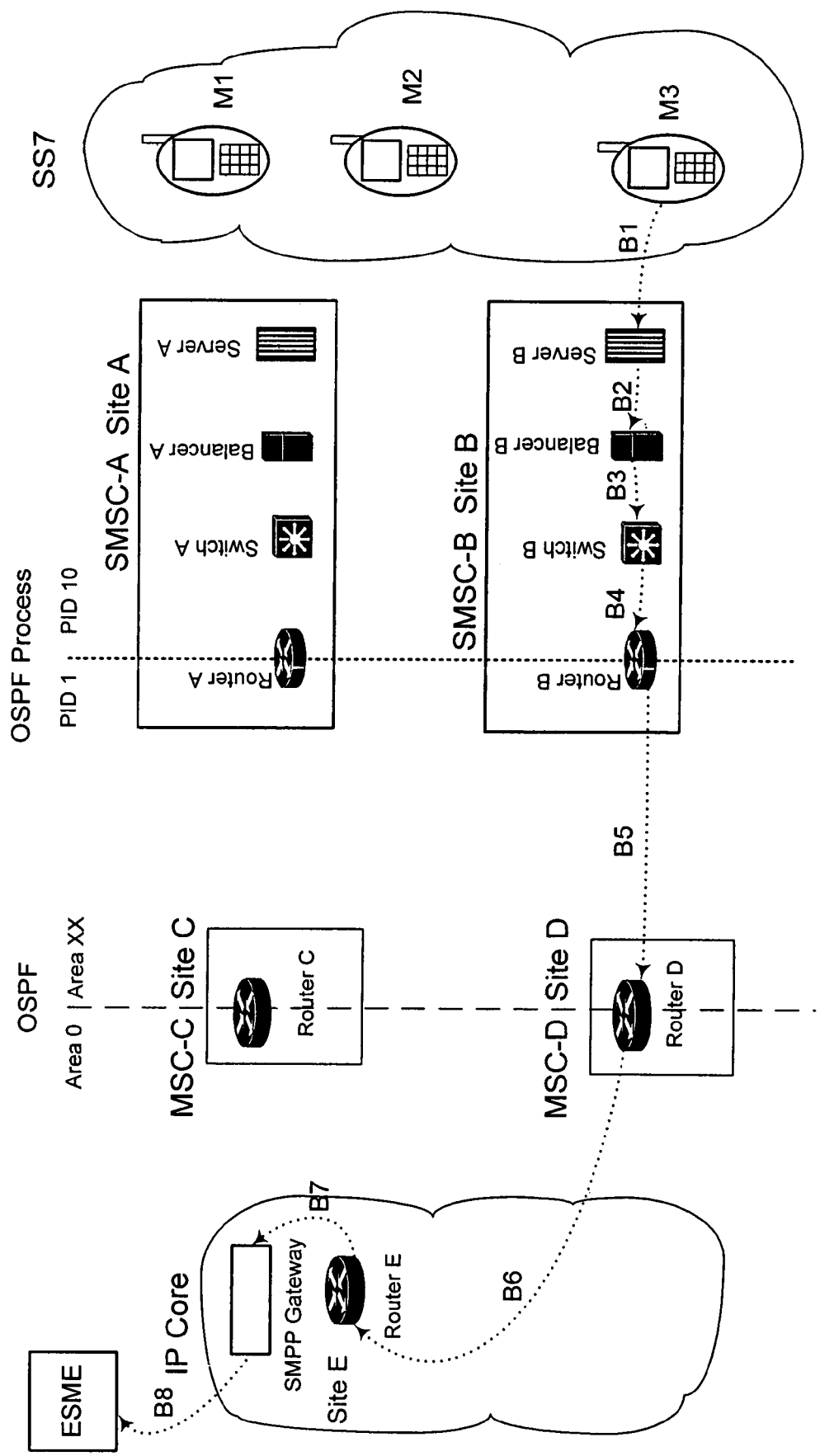
FIGURE 7 GEOGRAPHIC REDUNDANCY DETAIL – FLOW B

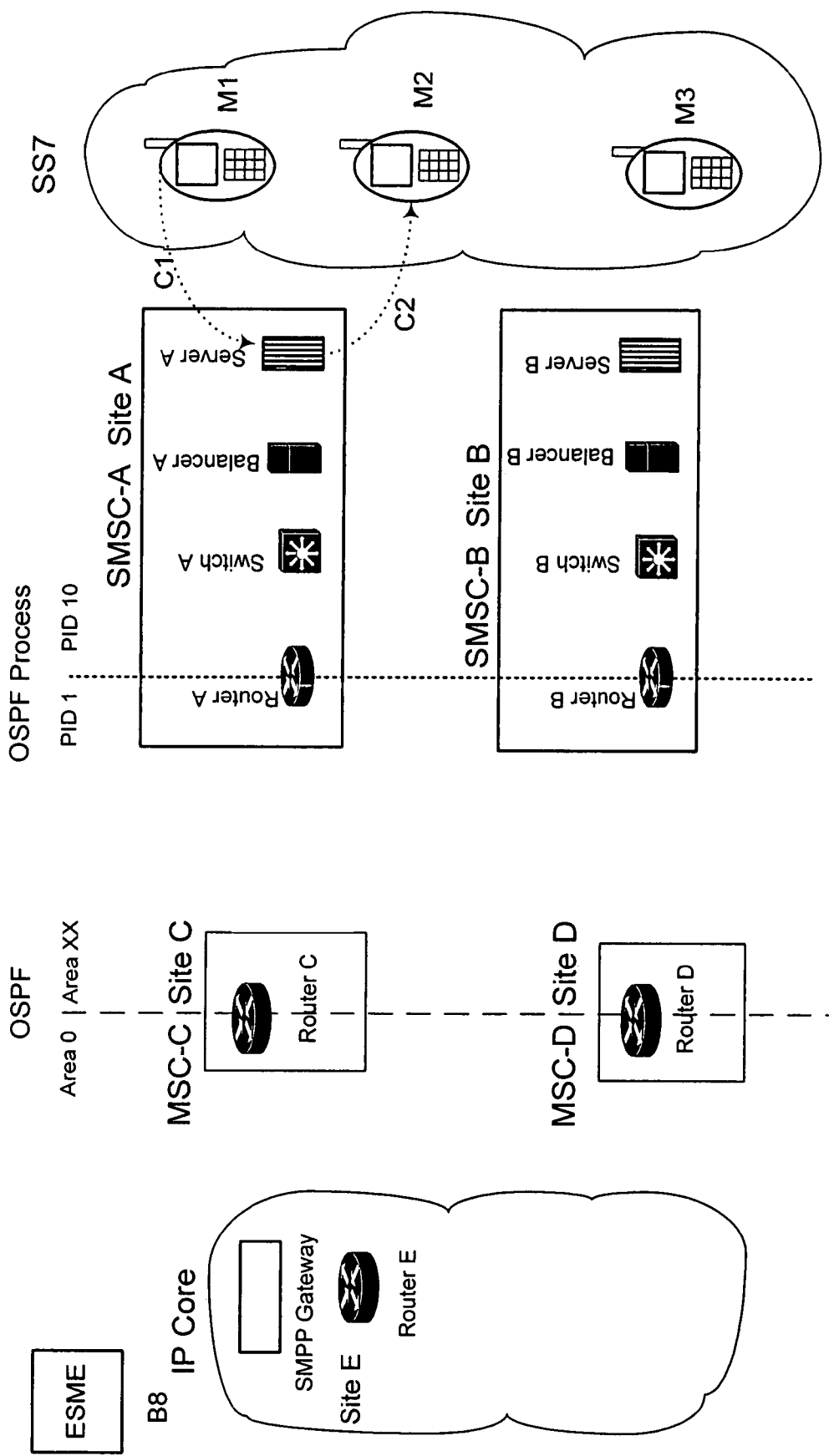
FIGURE 8 GEOGRAPHIC REDUNDANCY DETAIL – FLOW C

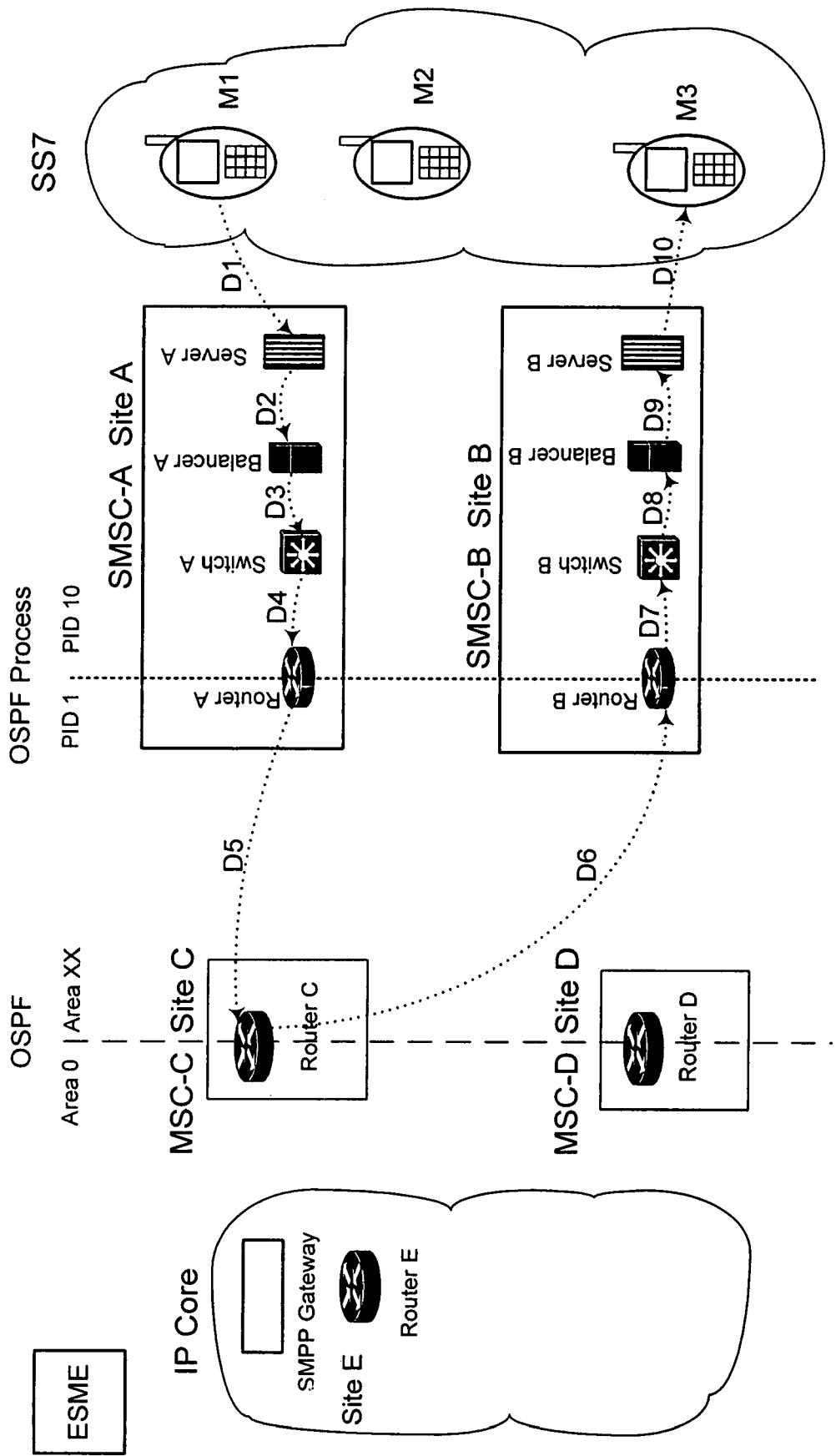
FIGURE 9 GEOGRAPHIC REDUNDANCY DETAIL – FLOW D

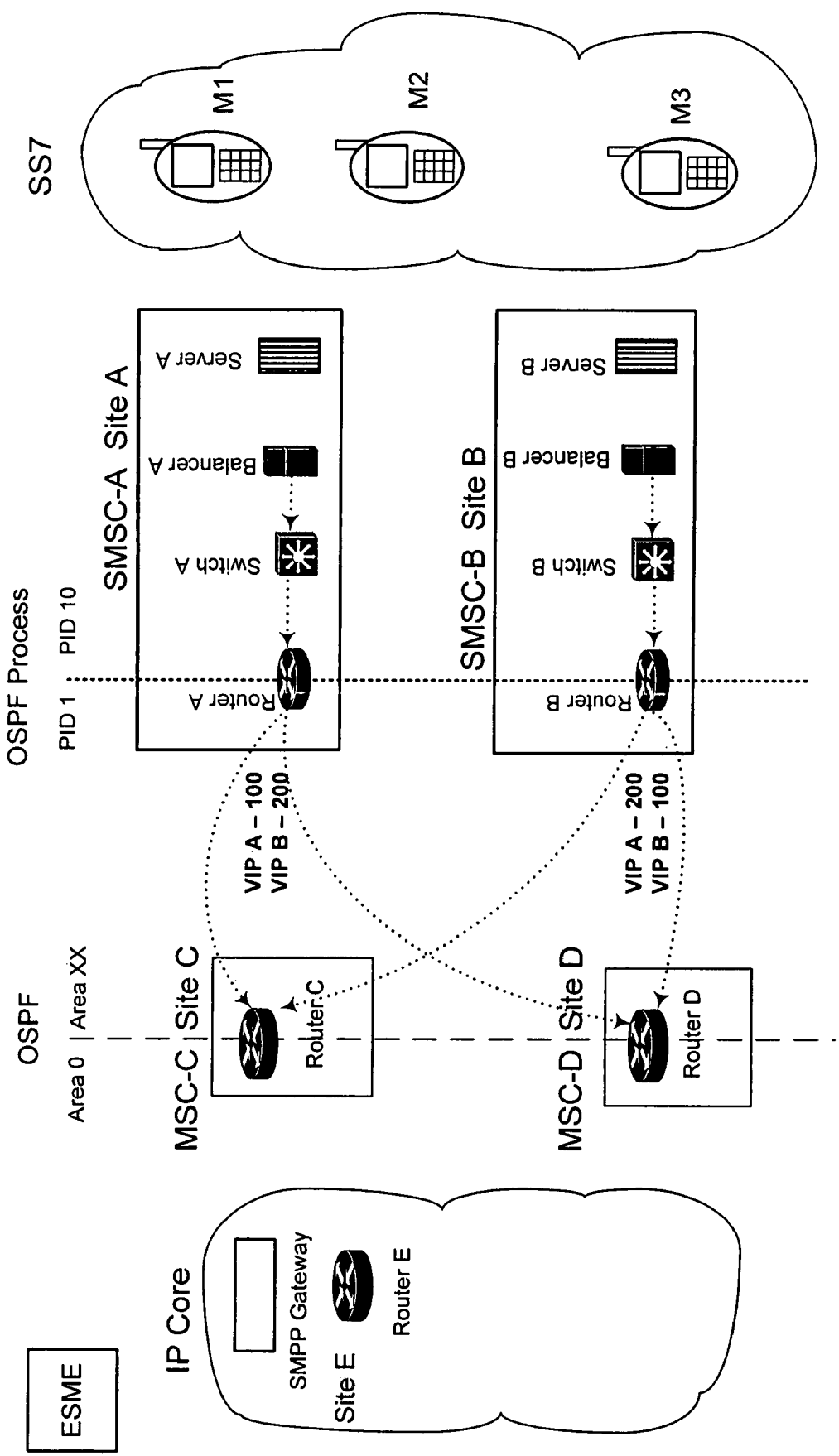
FIGURE 10 GEOGRAPHIC REDUNDANCY DETAIL – VIP

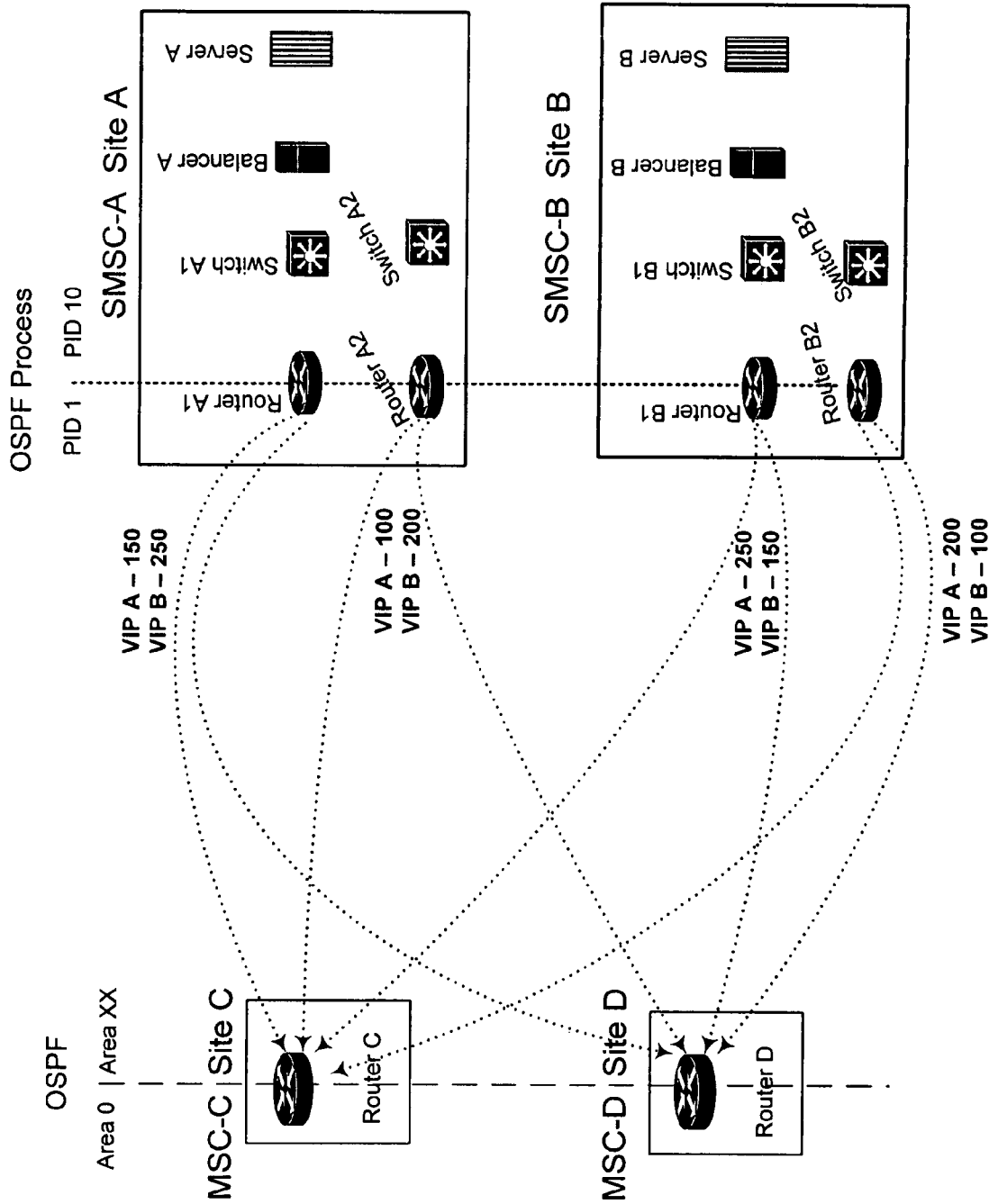
FIGURE 11 PARTIAL LOCAL REDUNDANCY

OSPF ROUTING TO GEOGRAPHICALLY DIVERSE APPLICATIONS USING OSPF AND ROUTE HEALTH INJECTION (RHI)

TECHNICAL FIELD

The present subject matter relates to equipment and processes for routing messages among geographically diverse message servers.

BACKGROUND

In recent years, mobile wireless communications have become increasingly popular. Initial implementations of mobile wireless communications, for example in the form of cellular telephone networks, supported circuit switched voice communication services. The carriers developed short message service (SMS) technology to provide text and/or e-mail communications via the wireless networks. Today wireless carriers also offer packet data communication services to their mobile customers. The deployment of broadband packet-based wireless networks allows the carriers and other service providers to offer a variety of new services via Multimedia Messaging Service (MMS) technologies, which enable users of mobile devices to send and receive multimedia content, such as text, graphics, digital photographs, audio files and video clips, via non-real-time transmission.

The SMS service, for example, provides text messages for display on the mobile devices. In a typical implementation, SMS communications to/from a mobile device use a signaling channel over the airlink and use out-of-band signaling resources of the mobile phone network for transport to/from a server platform referred to as a SMSC (Short Message Service Center). The SMSC, for example, receives packet communications containing text messages and forwards the messages via the signaling resources and the signaling channels to the appropriate mobile devices. The SMSC will also receive similar messages from the mobile devices and forward them to servers or terminal devices accessible via an Internet Protocol (IP) packet data network. An MMS service operates in a similar manner using packet data communications capabilities of enhanced network architectures, for example, using a MMSC (Multimedia Messaging Service Center) to perform functions analogous to those of the SMSC.

The SMSC or MMSC type message service center is typically implemented on a server platform having appropriate network connectivity and programming. To provide the level of service reliability typically expected by the network operators' customers, the servers are implemented in a redundant manner. Thus, if a first server fails, then a second server should take over the duties of the first server. The second server may be referred to as secondary, or redundant, or sister, or backup, or matched, or mated to the first server.

One conventional approach provides locally redundant message servers, so that if a first (primary) message server fails, then a second (backup) message server can provide backup service. In this conventional approach, both message servers reside in a single geographic site. If either server fails, then the remaining server is able to handle its own traffic, plus the traffic from the failed server. The term "mated pair" may be the most accurate term for the conventional solution, because the second server is the backup for the first server, and simultaneously and symmetrically the first server is the backup for the second server.

FIG. 2 illustrates a conventional locally redundant approach for message servers in a SMSC. An SMSC is a collection of hardware that resides in an access MSC and uses the SS7 network and a group of store-and-forward messaging servers to send and receive text messages between mobile handsets and other communication entities. Geographic zone 210 is served by an access Mobile Switching Center (MSC-1) 220 and does not have a Short Message Service Center. A second geographic zone 230 is served by a second access Mobile Switching Center (MSC-2) 240, which includes a Short Message Service Center (SMSC-AB) 250 with locally redundant message servers. Short Message Service Center (SMSC-AB) may serve two or more geographic zones. In this example, the SMSC-AB may serve at least geographic zones 210 and 230 through their respective access MSCs 220 and 240. There are at least two types of MSCs: access and distribution. The distinction between access and distribution MSCs will be discussed in more detail elsewhere.

The SMSC-AB 250 has locally redundant message servers: Server A 254, and Server B 258. If one message server fails, then the remaining message server will handle the additional ("failover") message server load. Short Message Service Center (SMSC-AB) may additionally have locally-redundant load balancers: Balancer-A 252, and Balancer-B 256. If one balancer fails, then the remaining balancer will handle the additional ("failover") balancer load.

FIG. 3 illustrates internal detail for a conventional locally redundant Short Message Service Center (SMSC-AB) with locally redundant message servers (Server A 335, and Server B 345). Short Message Service Center (SMSC-AB) may also have locally redundant load balancers (Balancer-A 330, and Balancer-B 340). The message servers may communicate with mobile phones through an SS7 network, or communicate with distribution mobile service centers (MSC) through a router.

Note the redundant communication paths 351-358, 361, and 362. For example, if Balancer-A 330 fails, and Server B 345 fails, then Server A 335 is still functional. Specifically, Server A 335 may still communicate via path 354 to Balancer-B; and Balancer-B may communicate via path 352 to Ethernet switch 320; and Ethernet switch 320 may communicate with a router via path 351. Thus, this example has locally redundant message servers, and also has locally redundant balancers.

In its conventional configuration, all traffic that flows either from an ESME (SMPP Gateway, VM complex, etc.) to a mobile handset or vice versa passes through the locally redundant message server solution depicted in FIG. 3. IP traffic destined for a mobile handset is routed towards a VIP address which is originated from the MSC that houses the hardware which is provisioned to handle a particular customer base. For example, Server A 335 may be provisioned to handle traffic from customers in geographic zone 210, and Server B 345 may be provisioned to handle traffic from customers in geographic zone 230. Traffic from these two geographic zones may be routed to SMSC-AB 250. SMSC-AB is associated with a first VIP address for Server A (VIP-A), and with a second VIP address for Server B (VIP-B).

To summarize, this locally redundant solution illustrated by FIG. 3 advertises two VIP addresses from a single SMSC site, and the customer base is divided among the two VIP addresses.

The problem with locally redundant message servers is that a local catastrophe such as a hurricane may destroy a geographic site containing both the primary and the backup servers. Analysis shows that 99.999% availability may not be feasible using locally redundant message servers.

As discussed above, the hardware that is housed in SMSC-AB 250 is locally redundant so in the event of a single message server failure (or single balancer failure), then there are backup devices to handle the transactions of the failed hardware. Unfortunately, this local redundancy does not protect against a catastrophic failure (such as a hurricane) at the local site which may destroy or isolate all hardware at the local site.

Hence, as a result of this vulnerability to catastrophic failure at a local site, a need exists to increase survivability by physically separating the message servers, and locating the message servers at two different sites. This geographic separation will insure survival and availability of one of the message servers in case of a catastrophic failure at a local site. This geographic separation may be necessary in order to achieve 99.999% availability of at least one message server.

SUMMARY

The teachings herein alleviate one or more of the above noted problems with locally redundant message servers by placing the servers in different geographic locations. In other words, the redundant message servers will be "geographically redundant" instead of locally redundant. Geographic redundancy protects against catastrophic failures at a single local site, and thus provides higher availability than local redundancy. A first message server is placed in a first geographic location, and a second message server is placed in a second geographic location. In some disclosed examples, Open Shortest Path First (OSPF) metrics may be used to properly route traffic to a surviving message server if one geographic location is destroyed.

In one example, a geographically redundant system of message servers includes a first message server with a first balancer at a first geographic site, and a second message server with a second balancer at a second geographic site. The first balancer is adapted to generate a first virtual Internet protocol address with a first routing metric for the first message server, and to generate a second routing metric for the second message server. The second balancer is adapted to generate a first virtual Internet protocol address with a third routing metric for the first message server (wherein the third routing metric is less attractive than the first routing metric), and to generate a second virtual Internet protocol address with a fourth routing metric for the second message server (wherein the fourth routing metric is more attractive than the second routing metric).

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

The term "message" will be used throughout this application in a broad sense, including simple character messages and/or complex multimedia messages. Concepts illustrated by SMS communications will also apply to MMS communications and other message communications.

FIG. 2 illustrates locally redundant message servers.

FIG. 3 illustrates internal detail for locally redundant messages servers.

FIG. 4 illustrates geographically redundant message servers.

FIG. 5 illustrates geographically redundant message servers, including the overall network.

FIG. 6 illustrates a communication path from an External Short Message Entity (ESME) to a mobile handset M1.

FIG. 7 illustrates a communication path from a mobile handset M3 to the ESME.

FIG. 8 illustrates a communication path from a mobile handset M1 to a mobile phone M2.

FIG. 9 illustrates a communication path from a mobile handset M1 to a mobile phone M3.

FIG. 10 illustrates virtual Internet protocol (VIP) advertisement with routing metrics for geographically redundant message servers.

FIG. 11 illustrates virtual Internet protocol (VIP) advertisement with routing metrics for geographically redundant message servers, with locally redundant routers.

DETAILED DESCRIPTION

Figure 1:
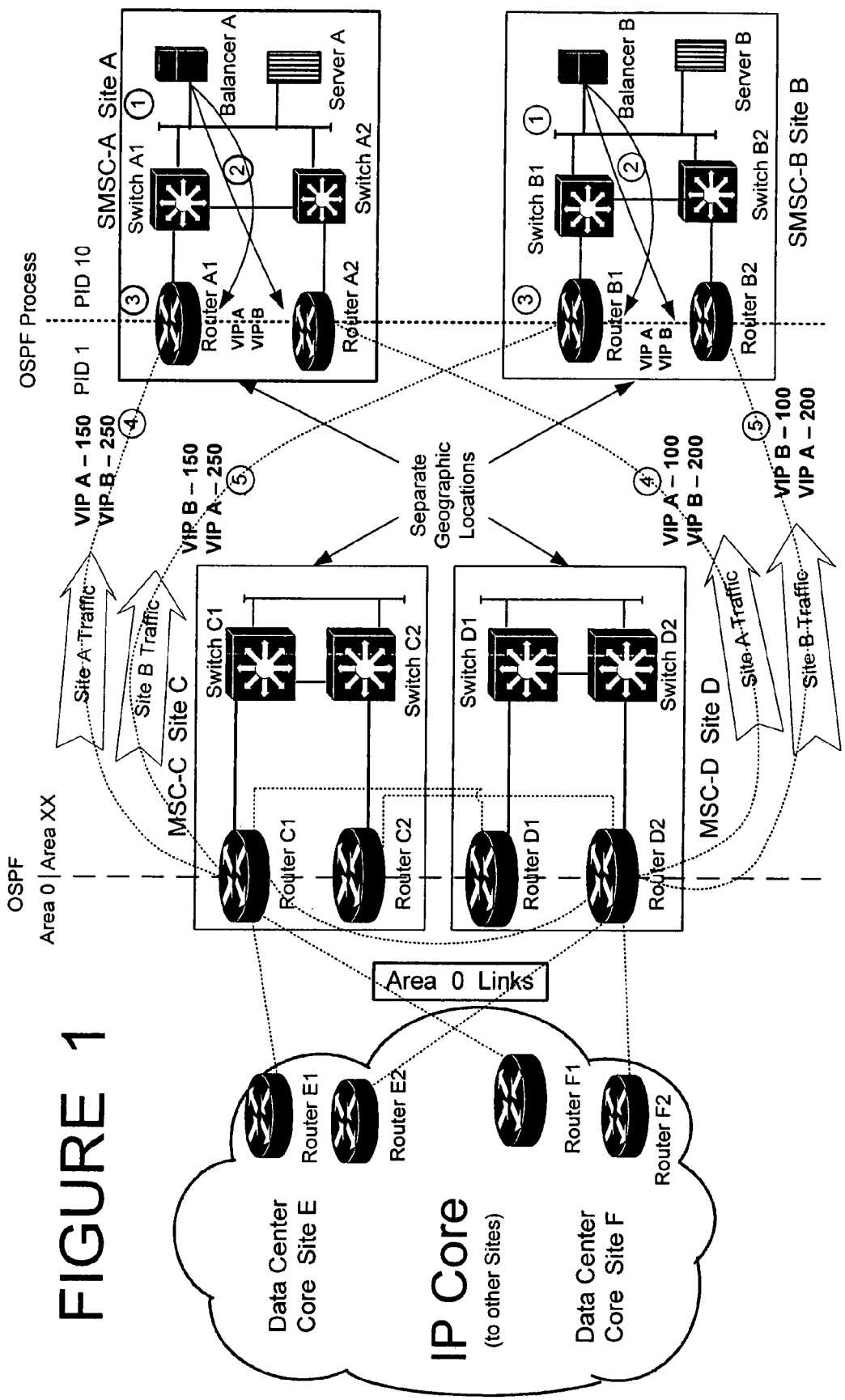
FIG. 1 illustrates a detailed hardware embodiment of geographically redundant message servers, with locally redundant routers, and virtual Internet protocol (VIP) advertisement with routing metrics for geographically redundant message servers, for example, for providing an SMS service to mobile network customers.

In the following detailed description, numerous specific details are set forth by way of examples in order to provide a thorough understanding of the relevant teachings. However, it should be apparent to those skilled in the art that the present teachings may be practiced without such details.

In other instances, well known methods, procedures, components, and circuitry have been described at a relatively high-level, without detail, in order to avoid unnecessarily obscuring aspects of the present teachings.

The various examples disclosed herein relate to geographically redundant message servers. Reference now is made in detail to the examples illustrated in the accompanying drawings and discussed below.

FIG. 1 illustrates an exemplary detailed hardware embodiment of geographically redundant message servers, with locally redundant routers, and with virtual Internet protocol (VIP) advertisement with routing metrics, as used to provide message service through a mobile/wireless communications network. Specifically, FIG. 1 illustrates an IP Core (Internet Protocol Core), a first mobile switching center MSC-C at site C, a second mobile switching center MSC-D at site D, a first short message service center SMSC-A at site A, and a second short message switching center SMSC-B at site B.

The IP Core may serve as an interface for Internet Protocol communication with other Short Message Service Centers such as External Short Message Entities (ESME) of other wireless communication carriers, and Internet addresses. For example, the IP Core may contain a Short Message Protocol Port (SMPP) Gateway at Data Center Core Site E to translate from a first wireless communication carrier's format for short messages to a second wireless communication carrier's format for short messages.

MSC-C at site C, and MSC-D at site D may each contain two routers (for example, Routers C1 and C2) which may be connected to two Ethernet switches (for example, Switch C1 and Switch C2).

There may be internal communication path redundancy among these routers and switches, as previously illustrated with FIG. 3. MSC-C at site C, and MSC-D at site D are also known as distribution MSCs. In contrast, SMSC-A at site A and SMSC-B at site B are each located inside of access MSCs.

The term "distribution MSC" refers to typical routing design, in which there may be: core, access, and distribution sites. In this application, a distribution site is an ABR (Area Border Router) location. The distribution router has networks that resides in both area 0, and in area XX. Thus, a distribution router connects a non-backbone area XX to the backbone area 0.

Each SMSC is located at a different geographic location. SMSC-A is located as site A, and SMSC-B is located at site B. SMSC-A may contain: a single message server (Server A); a single balancer (Balancer A); two Ethernet switches (Switches A2 and A2); and two routers (Routers A1 and A2). SMSC-A and SMSC-B each comprise part of distinct access MSCs. However, these distinct MSCs should reside in the same OSPF area.

For example, SMSC-A may be part of an access MSC at site A, and may reside in OSPF area 90. Similarly, SMSC-B may be part of an access MSC at site B, and should also reside in the same OSPF area as SMSC-A Server A and Balancer A may reside on a dedicated VLAN upon which they form an OSPF adjacency with Router A1 and A2. This VLAN is indicated by a circled 1 in SMSC-A.

Balancer A may perform a health check on Server A, and then advertise VIP addresses for Site A and for Site B to OSPF Process 10 on Router A1 and A2 via the VLAN. This health check and advertisement is indicated by a circled 2 in SMSC-A. This method of VIP advertisement is known as Route Health Injection whereby a VIP address is only advertised if the systems health check passes, otherwise the VIP advertisement is withdrawn and the system is considered down or offline.

Balancer A may run routing protocols such as OSPF, and may also perform predetermined or custom health checks against servers or services that exist on the network and determine whether or not those servers or services are online and have the ability to serve customer requests. For example, Balancer A may run a script that simulates an ESME connection to Server A. If Balancer A opens this connection with Server A and is recognized by Server A, then Balancer A considers Server A as available and online, and Balancer A will advertise the VIP address for Server A via OSPF to the routers. Thus, Balancer A checks the health of Server A, and advertises the VIP address for Server A only if Server A is healthy. Alternatively, if Server A fails the health check, then Balancer A will withdraw the advertisement. In other words, the Balancer checks the health of the route before injecting the route into OSPF.

Open Shortest Path First (OSPF) is used in FIG. 1 as an exemplary routing protocol. The Open Shortest Path First (OSPF) protocol is a link-state, hierarchical interior gateway protocol (IGP) for network routing. Dijkstra's algorithm is used to calculate the shortest path tree. It uses cost as its routing metric. A link state database is constructed of the network topology which is identical on all routers in the area.

OSPF is perhaps the most widely used IGP in large networks. It can operate securely, using MD5 to authenticate peers before forming adjacencies, and before accepting link-state advertisements (LSA). A natural successor to the Routing Information Protocol (RIP), it was VLSM-capable or classless from its inception. A newer version of OSPF (OSPFv3) now supports IPv6 as well. Multicast extensions to OSPF, the Multicast Open Shortest Path First (MOSPF) protocols, have been defined, but these are not widely used at present. OSPF can "tag" routes, and propagate the tags along with the routes.

An OSPF network can be broken up into smaller networks. A special area called the backbone area forms the core of the network, and other areas are connected to it. Inter-area routing goes via the backbone. All areas must connect to the backbone; if no direct connection is possible, a virtual link may be established.

Routers in the same broadcast domain or at each end of a point-to-point telecommunications link form adjacencies when they have detected each other. This detection occurs when a router "sees" itself in a hello packet. This is called a two way state and is the most basic relationship. The routers elect a designated router (DR) and a backup designated router (BDR) which act as a hub to reduce traffic between routers. OSPF uses both unicast and multicast to send "hello packets" and link state updates. Multicast addresses 224.0.0.5 and 224.0.0.6 are reserved for OSPF. In contrast to the Routing Information Protocol (RIP) or the Border Gateway Protocol (BGP), OSPF does not use TCP or UDP but uses IP directly, via IP protocol 89.

A potential design to provide geographically redundant message servers was proposed by a major communications corporation. However, this potential design relied on two items that are either not uniformly available in Verizon networks, or else violate Verizon routing and switching standards.

These violations include: the ability of an ESME to connect to an SMSC using a DNS (Domain Naming System) name instead of directly to an IP (Internet Protocol) address, and "Layer 2" links that can bridge the LAN infrastructure in two geographically separate SMSCs providing "Layer 2" connectivity from one site to the other.

Thus, other solutions were explored. One alternative solution used OSPF (Open Shortest Path First) routing protocol and Route Health Injection (RHI) to intelligently direct the SMS traffic to it's intended site while still providing site redundancy in the event of a hardware, software, or WAN facility failure which may disable an entire geographic site. RHI is a means by which keepalive methods (such as ping or HTTP GET) are used to determine whether an application or service is online and capable of handling connections before advertising the IP address associated with that service.

For as an example of this invention, a load balancer (such as a Cisco CSM) may simulate an ESME connection to a message server (such as a 1280 MAS05) as a health check to determine service availability before advertising the VIP address. If the health check fails, then the load balancer may withdraw the route and traffic may be dynamically re-routed to the back up location which is also advertising the VIP address, but with a slightly less attractive metric.

Some examples of this invention may satisfy some or all of the following technical goals:

1) Connectivity should be maintained to both the primary and the secondary site for the geographically redundant SMSCs.

2) No Layer 2 connectivity should extend between the sites.

3) Due to latency requirements, hardware for a pair of geographically redundant SMSCs should reside in access MSCs that are in the same OSPF area. The maximum number of OSPF areas (non-backbone areas) is limited by the amount of memory and processing power of the routers.

4) Geographically redundant pairs should be installed in Access MSCs or in Distribution MSCs which have dedicated ABRs.

5) Separate routing processes should be run on the Access MSC LAN routers to isolate the vendor owned hardware from the Verizon maintained hardware.

6) The design should maintain connectivity to the SMSCs even in the event of a hardware, software, or circuit failure. In other words, a user should maintain connectivity to at least one of SMSC-A or SMSC-B.

In order for OSPF to direct traffic to its intended site, there should be a way, from a routing perspective, to make the primary site look more attractive than the secondary site and still maintain connectivity to both the primary and backup sites. OSPF metrics may be used to force traffic to follow a first path over a second path in a non-failure scenario. It can be seen in the following figures and examples that the same Virtual IP (VIP) addresses for the SMSCs will be originated from the primary and backup sites at the same time, and OSPF metrics are used at the SMSCs to make the route to the primary site look more attractive than the same route which originates from the backup site. In OSPF, the advertisement with the lowest metric is installed in the IP routing table while the remaining advertisements stay in the OSPF database as candidate routes which are installed in the event that the route with the lowest metric ceases to exist.

Since the routing policy should be configured on Access SMSC routers, there should be no implementations of this design at Distribution sites where a dedicated ABR (Area Border Router) has not already been installed. An ABR (Area Border Router) is a router located on the border of one or more OSPF areas that connects those areas to the backbone network. ABRs are considered members of both the OSPF backbone and the attached areas. They therefore maintain routing tables describing both the backbone topology and the topology of the other areas. Geographically redundant message servers may not operate properly when traffic destined for a first message server must transit the second site on its way to the VIP of the first message server. Placing the geographically redundant routing policy on a router that is acting as an ABR and as an Access site LAN router may cause incorrect routing decisions to be made when traffic destined for the first message server is required to pass through distribution site routers.

Hardware responsible for load balancing traffic to components of the SMSC is generally configured by an outside vendor. Thus, in order to conform with Verizon data services routing policies and as a matter of networking best practices, it may preferable to have a point of demarcation between the routing processes on the an outside vendor's hardware and the routing processes on Verizon's hardware. This demarcation may be achieved by Routers A1, A2, B1, and B2 at the SMSC locations.

A routing process is a section of the configuration on a router which tells the which networks to route and which networks not to route for a specific protocol. The routing process will enable routing protocols such as OSPF routing, or BGP routing, or RIP routing.

A new routing process may be configured on the SMSC routers (Process ID 10) in each SMSC that will allow the SMSC routers to form an OSPF adjacency with a balancer (such as a CISCO 7603 with a Content Services Module installed). A prefix filter will be configured and applied via a route-map to the inbound routing updates on this new routing process. This will give Verizon the ability to only allow routs into the routing table that Verizon wishes to receive, and prevent the vendor from mis-configuring their device and attracting traffic to the site erroneously.

OSPF, while a fairly robust and flexible routing protocol, has its share of limitations. Laboratory experimentation revealed that if an OSPF router hears advertisements for the same VIP from more than one direction from the same routing protocol, then the router has no way of telling which advertisement to prefer unless the advertisements were modified before they are received.

Specifically, referring to Router A1 at SMSC-A in FIG. 1, note that a vertical dashed line crosses Router A1. Router A1 is configured with two distinct instances of OSPF. A first instance of OSPF is labeled Process ID 1 (PID 1) for processes on the left of the dashed line, and a second instance is labeled Process ID 10 (PID 10) for processes on the right of the dashed line. A Process ID is an identifier so that the router can keep track of which information is associated with a first routing process versus which information is associated with a second routing process. Each instance of OSPF maintains its own policy database. The router takes information from both instances, and merges them into a single IP routing table. More precisely, the routes that are filtered and learned from PID 10 are redistributed into the database that is contained in PID 1, so that the metrics for the VIP addresses can be manipulated.

A router performs a hierarchical ranking of route advertisements that it hears. First, administrative distance is considered regarding routing protocols, with lower administrative distances being preferred. A static route has an administrative distance of one, which is the best. EBGP has an administrative distance of 2, OSPF has a default administrative distance of 110, and IBGP has a default administrative distance of 120.

In laboratory experiments, problems occurred with the router during testing when the OSPF default administrative distance of 110 was used for PID 1 and also for PID 10. When a router hears two advertisements from the same routing protocol (OSPF in this case) with the same administrative distance, the router listens to the most recent advertisement that it hears, even if a route for the same VIP with a better metric was originally available.

The solution to this problem is to give PID 10 a different administrative distance than PID 1, and preferably a lower administrative distance than PID 1. In this solution, there is never a tie during the routing decision with respect to an advertisement from PID 10 versus an advertisement from PID 1. This effectively breaks the tie that would normally occur between the two processes because their administrative distances are no longer the same. Since PID 10 is locally significant (to the SMSC site), manipulating the administrative distance causes the local routers to scrutinize like advertisements before redistributing them into the common PID 1, at which point OSPF metrics are used for best path selection For example, regarding FIG. 1, Router A1 learns the VIP addresses for VIP A and VIP B from two different directions. For example, Router A1 learns VIP addresses for Site B from WAN connections out to the distribution MSCs (Site C and Site D), and Router A1 also learns VIP addresses for VIP B from the local Balancer A. The local Balancer A performs RHI on the Server A, and originates routes via OSPF process 10. In order to break the "tie" between the two route advertisements, the Administrative Distance (AD) of the OSPF Process 10 is modified to a more favorable value of 90 (110 is the default value). This makes the local router prefer the routes that originate from the SMSC and allows OSPF to direct traffic towards the primary sites in a non-failure scenario.

If the AD is not changed to a non-default value, then the first route for a specific prefix that a router learns is the one that "sticks" in the routing table, regardless of whether a better route comes in at a later time from the same routing protocol. With the AD modified, the routers will pay attention to both routing advertisements (because the routing advertisements are no longer "equal" protocols now that the AD has been modified on one process) and selects the best route to install in the IP routing table.

Here is an overview of exemplary routing policies exemplified by FIG. 1:

1) The servers and balancers may reside on a new VLAN (VLAN 34) and may form an OSPF adjacency with the SMSC routers. A new subinterface may be built on the SMSC routers so that the VIP address routing updates received from the balancer may be isolated from updates received from other routers.

2) Each balancer may perform a health check of the local message server as well as the message server in the sister site, and, assuming that all devices are available and able to handle traffic, will advertise VIP addresses for both servers at each site.

3) The SMSC routers will filter the routes that they learn from the balancer and redistribute the VIP addresses from OSPF Process 10 into OSPF Process 1, adjusting the metric to steer traffic to the primary site for a particular VIP as indicated in 4) and 5) below. An Administrative Distance of 90 is applied to OSPF Process 10 so that locally originated routes are not ignored by the SMSC routers when an advertisement for the same route is received from more than one direction. (The SMSC routers can not make an intelligent routing decision when they learn the same prefix from two different sources that are both OSPF).

4) VIP address A gets advertised out of Router A2 at site A with a metric of 100, and VIP B gets advertised out of Router A2 at site A with a metric of 200. VIP address A gets advertised out of Router A1 at site A with a metric of 150, and VIP address B gets advertised out of Router A1 at site A with a metric of 250. Router A2 is the primary LAN router for site A for the VIP subnet. If Router A2 fails, then traffic will still get directed to site A via Router A1.

5) VIP address B gets advertised out of Router B2 at site B with a metric of 100, and VIP A gets advertised out of Router B2 Site B with a metric of 200. VIP address B gets advertised out of Router B1 with a metric of 150, and VIP address A gets advertised out of Router B1 with a metric of 250. Router B2 is the primary router for site B for the VIP subnet. If Router B2 fails, then traffic will still bet directed to site B via Router B1.

6) The following summary may be used to make metric assignments once site A and site B have been identified, and the address space for each site has been assigned. At site A, Router A1, VIP-A=150 and VIP-B=250. At site A, Router A2, VIP-A=100 and VIP-B=200. At site B, Router B1, VIP-A=250 and VIP-B=150. At site B, Router B2, VIP-A=200 and VIP-B=100.

Physical connectivity of the hardware in an SMSC may be implemented using a VLAN. This VLAN lies between the message server subnet and the switches in the SMSC. This VLAN should also be included in the trunk that connects the SMSC routers to the switches and a router interface should be created so that the SMSC routers can direct traffic to the new subnent when the traffic is destined for either the VIP addresses of the SMSC server or to the physical address of the message server itself. Placing RTBD Update traffic on a different physical interface than the actual messaging traffic causes a problem with keepalives between the sites. Thus, it is preferable to keep this RTBD Update traffic with the SMS bearer traffic.

FIG. 1 has a dotted line, labeled "OSPF Process," which runs vertically through Routers A1, A2, B1, and B2. This dotted line delineates that two routing process are used in order to isolate vendor routing processes.

Two routing processes are run on each of these routers. One routing process is common with the engineering data network (the administrative and management network), and the second routing process only allows the router to form an adjacency with the vendor hardware (the Balancer). The routes from each of the two processes are not commingled, and are kept in separate databases.

Routers A1 and A2 filter routes that they learn from the Balancer, and redistribute the VIPs from the dedicated OSPF Process ID 10 to the production OSPF Process ID 1, adjusting the metric to steer traffic to the primary sites as indicated by the arrows marked with circled 4 and circled 5. An OSPF metric of 90 is applied to OSPF Process 10 so that the local routes are not ignored on routers A2 and A2 when the same advertisement is heard from two different directions. Routers A1 and A2 can't make an intelligent routing decision when the choice is "OSPF< >OSPF."

PID 10 and PID 1 are process identifications that the router uses to keep track of the separate OSPF processes. These identifications are only locally significant on the router to keep databases separate.

Site A serves as the primary site for VIP address A, and site B serves as the backup site for VIP address A. Routers A1 and A2 advertise VIP A out of site A with a relatively low metric (relatively high attractiveness) in comparison to advertisements of VIP A from site B. The metrics serve as a tie breaking criteria when routing traffic. Specifically, Router A1 advertises VIP A-150, Router A2 advertises VIP A-100, Router B1 advertises VIP A-250, and Router B2 advertises VIP A-200. All of these advertisements for VIP A are sent to Routers C1, C2, D1, and D2, where they are stored in updated routing tables.

When Router C1, for example, receives traffic for VIP A, Router C1 will examine a look up tables for one or more stored advertisements regarding VIP A. If multiple advertisements for VIP A are stored, then Router C1 will select the advertisement with the lowest (most attractive metric). If advertisements from Routers A1, A2, B1, and B2 have been received, then Router C1 will select advertisement "VIP A-100" from Router A2 as the most attractive advertisement, and will attempt to route VIP A traffic to Router A2.

Note that both metrics from site A for VIP A (150 and 100) are lower than both metrics from site B for VIP A (250 and 200). Thus, if either router from site A is receiving, then all traffic for VIP A will be directed to site A.

Specifically, all traffic for VIP A will be directed to Router A2 (VIP A-100) if Router 2 is receiving. If Router 2 is not receiving (due to failure of Router 2), and Router A1 is receiving (VIP A-150), then all traffic for VIP A will be directed to Router A1. If Routers A2 and A1 are not receiving (due to a failure of server A; or a failure of Balancer A; or a failure of both Routers A2 and A2), then all traffic for VIP A will be directed to Router B2 (VIP A-200), if Router B2 is receiving. If Routers A2, A2, and B2 are not receiving, then all traffic for VIP A will be directed to Router B1, if Router B1 is receiving.

In other words, traffic to VIP A will be directed to Router A2 (VIP A-100) if possible, then A1 (VIP A-150) if necessary, then B2 (VIP A-200) if necessary, then B1 (VIP A-250) if necessary. This illustrates the use of geographically redundant message servers, with additional local router redundancy.

Inversely, site B serves as the primary site for VIP B, and site A serves as the backup site for VIP B. Traffic to VIP B will be directed to Router B2 (VIP B-100) if possible, then B1 (VIP B-150) if necessary, then A2 (VIP B-200) if necessary, then A1 (VIP B-250) if necessary. The circled 4 indicates traffic to site A, and the circled 5 indicates traffic to site B.

In other words, geographically redundant message servers with local router redundancy can be broadly described as follows. A first geographic site (site A, for example) is adapted to advertise: i) a first virtual Internet protocol address with a first routing metric for the first message server via the first router, ii) a second virtual Internet protocol address with a second routing metric for the second message server via the first router, iii) the first virtual Internet protocol address with a third routing metric for the first message server via the second router, and iv) the second virtual Internet protocol address with a fourth routing metric for the second message server, via the second router.

A second geographic site (site B) is adapted to advertise: i) the first virtual Internet protocol address with a fifth routing metric for the first message server via the third router, ii) the second virtual Internet protocol address with a sixth routing metric for the second message server via the third router, iii) the first virtual Internet protocol address with a seventh routing metric for the first message server via the fourth router, and iv) the second virtual Internet protocol address with an eighth routing metric for the second message server via the fourth router.

Additionally, the following rules may apply: the first, third, fifth, and seventh routing metrics are all different from each other. The first and third are each more attractive than the fifth and the seventh routing metrics. The second, fourth, sixth, and eighth routing metrics are all different from each other. The sixth and eighth are each more attractive than the second and the fourth routing metrics.

These general rules summarize the example of FIG. 1. All advertised routing metrics for VIP A (first, third, fifth, and seventh routing metrics) must be different from each other, in order to establish an unambiguous routing hierarchy. Further, both the metrics from the first site for VIP A (first and third routing metrics) must be more attractive than the metrics from the second site for VIP A (fifth and seventh routing metrics) so that the first site is the primary site for VIP A (all VIP A traffic will go to the primary site if possible). The inverse logic applies to VIP B, and site B serves as the primary site for VIP B. Note that the exact value of the routing metric is not important (as long as it is not the default value of 90 in OSPF), but rather the order of attractiveness for each routing metric for a specific VIP address is important. In other words, attractiveness is determined relative to competing advertisements for the same VIP.

FIG. 2 illustrates locally redundant message servers, and was discussed above in the Background section.

FIG. 3 illustrates internal detail for locally redundant message servers, and was discussed above in the Background section.

FIG. 4 illustrates geographically redundant message servers. Geographic zone-1 410 is served by mobile switching center-1 (MSC-1) 420. Mobile switching center-1 420 contains short message service center-A (SMSC-A) 460. Short message service center-A contains balancer-A 462 and Server A 464. Similarly, geographic zone-2 430 is served by mobile switching center 2 440, which contains short message service center-B 470, which contains balancer-B 472 and Server B 474. One short message service center may server multiple geographic zones. In other words, a mobile switching center may not have a short message service center.

Traffic volumes and bandwidth requirements in and out of a SMSC revolve around a metric known as Messages per Second (MPS). Currently, the maximum size of a text message is 160 characters, so volume and bandwidth statistics may be determined by the following equation: (number of messages per second)×(160 bytes per message)=number of bytes per second. This equation assumes 160 characters per message, at one byte per character, equals 160 bytes per message.

Another traffic flow that needs to be considered is Real Time Data Base (RTDB) Update traffic. This traffic exists now in the locally redundant solution, but as the devices in the complex are separated, this synchronization traffic will have to traverse WAN connections between SMSCs and must be taken into consideration.

The amount of traffic required to keep the databases in sync is not a hard and fast number, but is related to sever factors comprising: the number of messages per second, the latency between the sites, and a metric known as MDA (Message Delivery Attempts). MDA is an indication of how many times the SMSC unsuccessfully tries to deliver a message to either a handset or ESME before the message is written to disk and added to a "to-do" log which tells the servers to attempt to deliver the message again after a predetermined amount of time.

Should there be a failure in one of the two mated SMSC sites, the database will have to resynchronize its information between the sites once both the primary and secondary sites are back online. Testing was conducted in Verizon's lab under worst case failure, then recovery scenarios. Approximately 12 Mb/s of site to site bandwidth was consumed as the systems were re-synchronizing their databases. These figures were observed when stress testing the systems with approximately 1100 MPS using an ESME simulator and a latency device to simulate 50 ms of latency between the 2 sites.

FIG. 5 illustrates geographically redundant message servers, associated network entities. A first message server, Server A, may be in SMSC-A located at a first geographic site A. A second message server, Server B. may be in SMSC-B located at a second geographic site B. Server A and Server B are located at different geographic sites so that a hurricane destroying site A will not affect Server B at site B. Thus, the message servers are geographically redundant.

SS7 is a communication network using signaling system seven (SS7) protocols for communication between the Servers A and B, and mobile handsets M1, M2, and M3.

SMSC-A at site A may contain: Server A, Balancer A, Switch A, and Router A. SMSC-B at site B may contain: Server B, Balancer B, Switch B, and Router B.

MSC-C and MSC-D are distribution MSCs and may distribute communications between SMSC sites, or between an SMSC site and IP Core. Distribution MSCs may serve as an OSPF boundary between Open Shortest Path First area 0 and area XX.

IP Core may contains Router E, and a Short Message Peer-to-peer Protocol (SMPP) Gateway for communication with External Short Message Entities (ESME).

The Open Shortest Path First (OSPF) boundary separates Area 0 from Area XX, and Open Shortest Path First (OSPF) Process boundary separates PID 1 from PID 10. These boundaries are used for Open Shortest Path First routing.

FIGS. 6-9 illustrate various communication paths through the hardware of FIG. 5.

FIG. 6 illustrates a communication path from an External Short Message Entity (ESME) to a mobile phone M1. For example, the External Short Message Entity (ESME) may be a mobile handset from a distinct telecommunications service provider sending a short message (such as 160 characters) to mobile handset M1. This short message may follow path A1 to SMPP Gateway, then path A2 to Router E, then path A3 to Router C in Distribution MSC-C, then path A4 to Router A in SMSC-A; then path A5 to Switch A, then path A6 to Balancer A, then path A7 to Server A, then path A8 to mobile handset M1.

FIG. 7 illustrates a communication path for a short message from mobile handset M3 to ESME. This short message may follow path B1 to Server B, then path B2 to Balancer B, then B3 to Switch B, then B4 to Router B, then path B5 to Router D, then path B6 to Router E, then path B7 to SMPP Gateway, then path B8 to ESME.

FIG. 8 illustrates a communication path for a short message from a mobile handset M1 to a mobile handset M2. This short message may follow path C1 to Server A, then path C2 to mobile handset M2.

FIG. 9 illustrates a communication path for a short message from a mobile phone M1 to a mobile phone M3. This short message may follow path D1 to Server A, then path D2 to Balancer A, then path D3 to Switch A, then path D4 to Router A, then path D5 to Router C, then path D6 to Router B, then path D7 to Switch B, then path D8 to Balancer B, then path D9 to Server B, then path D10 to mobile handset M3.

FIG. 10 illustrates virtual Internet protocol (VIP) advertisement with routing metrics for geographically redundant message servers. Balancer A monitors the health of Server A, optionally using route health injection (RHI).

Four scenarios may be considered for messages to VIP A.

First scenario, if both message servers are healthy, then a message for VIP A will hear two advertisements: VIP A-100 from Router A, and VIP A-200 from Router B. The message for VIP A will be routed to the most attractive metric, which is the lowest metric if OSPF metrics are used. Thus, the message for VIP A will be routed towards Router A and then to Server A (if both message servers are healthy).

Second scenario, if Server A is healthy and Server B is not healthy, then a message for VIP A will only hear one advertisement: VIP A-100 from Router B. The message for VIP A will be routed to the only advertisement for VIP A. Thus, the message for VIP A will be routed towards Router A and then to Server A (if Server A is healthy and Server B is not healthy).

Third scenario, if Server A is not healthy and Server B is healthy, then a message for VIP A will only hear one advertisement: VIP A-200 from Router B. The message for VIP A will be routed to the only advertisement for VIP A. Thus, the message for VIP A will be routed towards Router B and then Server B.

Fourth scenario, if Server A is not healthy and Server B is not healthy, then a message for VIP A will not hear any advertisement, and will fail to be delivered.

Thus, messages for VIP A will be routed to Server A if message server A is healthy (first and second scenario); will be routed to Server B if message server A is not healthy but Server B is healthy (third scenario); and will fail if neither message server is healthy (fourth scenario).

In other words, Server A is the primary server for messages to VIP A, and message server B is the secondary or redundant or backup server for messages to VIP A.

Messages to VIP B similarly have four scenarios, except that Server B is the primary server for messages to VIP B, and message server A is the secondary or redundant or backup server for messages to VIP B.

If OSPF metrics are used, then non-default metric values should be used so that the routing tables are updated when advertisements using non-default metric values are received.

This system may be expanded to include a third geographic site with a third message server-C (not shown). For example, the Router A may advertise: VIP A-100, VIP B-200 and VIP C-300. Router B may advertise: VIP A-200, VIP B-300, and VIP C-100. The router at the third geographic site may advertise: VIP A-300, VIP B-100, and VIP C-200. In this fashion, the third message server at the third geographic site would be available if the first two sites failed. Thus, geographic redundancy is not limited to two sites, but may be expanded to three or more sites.

FIG. 11 illustrates virtual Internet protocol (VIP) advertisement with routing metrics for geographically redundant message servers, with locally redundant routers. In order to increase the reliability of each geographic site, redundant routers may be placed at each site. FIG. 11 is a simplified version of FIG. 1, and additionally shows the redundant routers each directly advertising to both distribution MSCs (MSC-C and MSC-D). VIPs are advertised from the access sites (site A and site B) to the distribution sites (site. C and site D) with the metrics and VIPs as indicated in FIG. 11.

For example, at site. A, Router A1 may advertise VIP A-150 and VIP B-250, and Router A2 may advertise VIP A-100 and VIP B-200. At site B, Router B1 may advertise VIP A-250 and VIP B-150, and Router B2 may advertise VIP A-200 and VIP B-100.

In a first scenario, if Routers A1, A2, B1, and B2 and Servers A and B are healthy, then a message for VIP A would hear the following advertisement: VIP A-150 from Router A1, VIP A-100 from Router A2, VIP A-250 from Router B1, and VIP A-200 from Router B2. The message for VIP A would be directed to VIP A-100 from Router A.

The other scenarios for FIG. 11 are similar to those discussed above in FIG. 10, except that locally redundant routers have been introduced to compensate for router failure.

This system for redundant routers similarly applies to the simple case of a single redundant router at a first geographic site, with no redundant routers at a second geographic site. Additionally, this system for redundant routers similarly applies to the complex case of three or more routers located at each of three or more geographic sites.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

For example, although SMSCs (Short Message Service Centers) have been illustrated in the drawings, the geographically redundant routing logic may be applied to MMS (Multimedia Messaging Service for pictures with integrated text and voice) communications or to packet type communications.

It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

ABR An ABR (Area Border Router) is a router located on the border of one or more OSPF areas that connects those areas to the backbone network. ABRs are considered members of both the OSPF backbone and the attached areas. They therefore maintain routing tables describing both the backbone topology and the topology of the other areas.

AD Administrative Distance.

BGP Border Gateway Protocol. BGP is a Gateway Protocol which routers employ in order to exchange appropriate levels of information. In an intradomain routing environment between Automomus Systems, IBGP (Internal BGP) is run, allowing the free exchange of information between trusted systems. IBGP is in a class of protocols known as IGPs, or Internal Gateway Protocols. In an interdomain environment, EBGP (External BGP) is run, allowing the routers to exchange only prespecified information with other prespecified routers in other domains in order to ensure that their integrity is maintained. EBGP is in a class known as EGPs, or External Gateway Protocols. When BGP peer routers first establish contact, they exchange full routing tables; subsequent contacts involve the transmission of changes, only.

BTS Base Transceiver Station. A wireless communications term. A GSM (Global System for Mobile Communications) device used to transmit radio frequencies over the air interface.

CCIS Common Channel Interface Signaling. A way of carrying telephone signaling information along a path different from the path used to carry voice. CCIS occurs over a separate packet switched digital network. CCIS is separate from the talk path. Signaling for a group of voice telephone circuits is done on CCIS by encoding the information digitally on one of the voice circuits.

CSM Content Services Module. For example, a Cisco CSS on a blade. Exemplary hardware for use as a load balancer in an access mobile switching center.

DSN Distributed Systems Network. The network architecture developed by Hewlett-Packard.

EBGP External BGP. See BGP.

EDN Engineering Data Network.

ESME External Short Messaging Entity.

ETHERNET a protocol for interconnecting computers and peripheral devices in a local area network.

FOA First Office Application. A term used by telephone companies which is similar to beta testing.

GDMAS Geographically Diverse MAS.

G3. Third Generation Mobile System. An ITU-T discussion over a proposed worldwide cellular phone GSM standard. Usually called 3G.

IBGP Internal BGP. See BGP.

IP Internet Protocol. The set of standards responsible for ensuring that data packets transmitted over the Internet are routed to their intended destinations. These standards describe software that keeps track of the Internet's addresses for different nodes, routes outgoing messages and recognizes incoming messages. The software allows a packet to traverse multiple networks on the way to its final designation.

ISDN Integrated Services Digital Network. A set of international standards set by the ITU-T (International Telecommunications Union-Telecommunications Services Sector) for a circuit-switched digital network that supports access to any type of service (e.g., voice, data, and video) over a single, integrated local loop from the customer premises to the network edge. ISDN requires that all network elements (e.g., local loops, PBXs, and COs) be ISDN-compatible, and that the SS7 (Signaling System 7) be in place through out the entire network.

ISUP Integrated Services Digital Network User Part. Provides for transfer of call setup signaling information between signaling points. ISUP determines the procedures for setting up, coordinating, and taking down trunk calls on the SS7 network. One of four basic sub-protocols in the SS7 protocol.

LAN Local Area Network.

MAS Exemplary hardware for a text messaging server in a short message service center. For example, a SUN Netra 1280 Unix Server.

MDA Message Delivery Attempts.

MO Mobile Originated.

MMS Multimedia Service. A service, similar to SMS (Short Message Service), but adapted for pictures with integrated text or voice.

MPS Messages Per Second.

MR Mobile Received.

MSC Mobile Switching Center. A switch providing services and coordination between mobile users in a network and external networks. Also see MTSO.

MT Mobile Terminated.

MTP Message Transfer Part. Provides functions for basic routing of signaling messages between signaling points. One of four basic sub-protocols in the SS7 protocol.

MTSO Mobile Telephone Switching Office. This central office houses the field monitoring and relay stations for switching calls between the cellular and wire-based (landlline) central office. The MTSOs control the entire operation of a cellular system. It is a sophisticated complex of computers that monitors all cellular calls, keeps track of the location of all cellular-equipped vehicles traveling in the system, arranges handoffs, keeps track of billing information, etc. Also See MSC.

OSPF Open Shortest Path First.

PSTN Public Switched Telephone Network. PSTN refers to the entire interconnected collection of local, long distance and international phone companies.

RHI Route Health Injection.

RTDB Real Time DataBase.

SCC Signaling Connection Control Part. Provides for additional routing and management functions for transfer of messages other than call setup between signaling points. One of four basic sub-protocols in the SS7 protocol.

SMPP Short Message Peer-to-Peer Protocol. A protocol, developed by Logica Aldiscon, that provides the capability to deliver email and voicemail between wired and wireless networks.

SMS Short Message Service. A means to send or receive, short alphanumeric messages to or from mobile telephones.

SMSC Short Message Service Center. On a wireless network, allows short text messages to be exchanged between mobile telephones and other networks. It is the entity that stores and forwards Short Message Service (SMS) messages.

SS7 Signaling System 7, or Signaling System Seven. Signal systems have three basic functions: supervising, alerting, and addressing. The SS7 protocol consists of four basic sub-protocols: (1) Message Transfer Part (MTP) provides functions for basic routing of signaling messages between signaling points; (2) Signaling Connection Control Part (SCC) provides for additional routing and management functions for transfer of messages other than call setup between signaling points; (3) Integrated Services Digital Network User Part (ISUP) provides for transfer of call setup signaling information between signaling points; and (4) Transaction Capabilities Application Part (TCAP) provides for transfer of non-circuit related information between signaling points.

STP Signal Transfer Point. The packet switch in the Common Channel Interoffice Signaling (CCIS) system. The CCIS is a packet switched network.

TCAP Transaction Capabilities Application Part provides for transfer of non-circuit related information between signaling points. One of four basic sub-protocols in the SS7 protocol.

VIP Virtual IP. Virtual Internet Protocol.

VIPR Virtual IP Routing extends private route tables and address spaces from the enterprise into the service provider's routing/switching infrastructure. VIPR is essentially a logical partitioning of a physical IP router owned and operated by the service provider.

VLAN Virtual Local Area Network. A means by which LAN users on different physical LAN segments are afforded priority access privileges across the LAN backbone in order that they appear to be on the same physical segment of an enterprise-level logical LAN.

VZW Verizon Wireless.

WAN Wide Area Network.

What is claimed is:

1. A geographically redundant system of message servers, for storing and forwarding communication of messages for mobile stations through a mobile communication network, comprising:
   a) a first message server at a first geographic site;
   b) a second message server at a second geographic site;
   c) a first balancer at the first geographic site;
      wherein the first balancer is adapted to generate a first virtual Internet protocol address with a first routing metric for the first message server, and
      wherein the first balancer is adapted to generate a second virtual Internet protocol address with a second routing metric for the second message server; and
   d) a second balancer at the second geographic site;
      wherein the second balancer is adapted to generate a first virtual internet protocol address with a third routing metric for the first message server, and the third routing metric is less attractive than the first routing metric, and
      wherein the second balancer is adapted to generate a second virtual internet protocol address with a fourth routing metric for the second message server, and the fourth routing metric is more attractive than the second routing metric;
   e) a first router at the first geographic site; and
   f) a second router at the second geographic site;
      wherein the first and second routers are adapted to operate with a first instance of Open Shortest Path First associated with a first administrative distance, and with a second instance of Open Shortest Path First associated with a second administrative distance,
      wherein the first instance of Open Shortest Path First is associated with an internal message server network, and the second instance of Open Shortest path First is associated with an external public facing network, and
      the first administrative distance is less than the second administrative distance.

2. The geographically redundant system of message servers of claim 1, wherein the message servers are connected to a signaling system seven network for communication with mobile handsets.

3. The geographically redundant system of message servers of claim 1, wherein the balancers are connected to Ethernet switches and routers for communication with distribution mobile switching centers.

4. The geographically redundant system of message servers of claim-3, wherein the distribution mobile switching centers are connected to a gateway, and wherein the gateway is configured for using short message peer-to-peer protocol for communicating with external short message entities.

5. The geographically redundant system of message servers of claim 3, wherein the distribution mobile switching centers are connected to a wireless Internet gateway for Internet connectivity.

6. A geographically redundant system of message servers, for storing and forwarding communication of messages for mobile stations through a mobile communication network, with locally redundant routers, comprising:
   a) a first geographic site including a first message server, a first balancer; a first router, and a second router; and
   b) a second geographic site including a second message server, a second balancer, a third router, and a fourth router,
   wherein the first geographic site is adapted to advertise:
      i) a first virtual Internet protocol address with a first routing metric for the first message server via the first router,
      ii) a second virtual Internet protocol address with a second routing metric for the second message server via the first router,
      iii) the first virtual Internet protocol address with a third routing metric for the first message server via the second router,
      iv) the second virtual Internet protocol address with a fourth routing metric for the second message server, via the second router, and
   wherein the second geographic site is adapted to advertise:
      i) the first virtual Internet protocol address with a fifth routing metric for the first message server via the third router,
      ii) the second virtual Internet protocol address with a sixth routing metric for the second message server via the third router,
      iii) the first virtual Internet protocol address with a seventh routing metric for the first message server via the fourth router,
      iv) the second virtual Internet protocol address with an eighth routing metric for the second message server via the fourth router,
   wherein the first, third, fifth, and seventh routing metrics are all different from each other,
   wherein the first and third routing metrics are each more attractive than the fifth and the seventh routing metrics,
   wherein the second, fourth, sixth, and eighth routing metrics are all different from each other, wherein the sixth and eighth routing metrics are each more attractive than the second and the fourth routing metrics, wherein the first, second, third and fourth routers are adapted to operate with a first instance of Open Shortest Path First associated with a first administrative distance, and with a second instance of Open Shortest Path First associated with a second administrative distance, wherein the first instance of Open Shortest Path First is associated with an internal message server network, and the second instance of Open Shortest path First is associated with an external public facing network, and the first administrative distance is less than the second administrative distance.

7. The geographically redundant system of message servers of claim 6, wherein the message servers are connected to a signaling system seven network for communication with mobile handsets.

8. The geographically redundant system of message servers of claim 6, wherein the balancers are connected to Ethernet switches and routers for communication with distribution mobile switching centers.

9. The geographically redundant system of message servers of claim 8, wherein the distribution mobile switching centers are connected to a gateway, and wherein the gateway is configured for using short message peer-to-peer protocol for communicating with external short message entities.

10. The geographically redundant system of message servers of claim 6, wherein the routing metrics are Open Shortest Path First metric values.

11. The geographically redundant system of message servers of claim 10, wherein none of the routing metrics are default routing metrics.

* * * * *